United States Patent

[11] 3,629,826

[72] Inventors Alfred Cutaia; John W. McCullough; Don W. Piller, all of Rochester, Minn.

[21] Appl. No. 338
[22] Filed Jan. 2, 1970
[45] Patented Dec. 21, 1971
[73] Assignee International Business Machines Corporation Armonk, N.Y.

[54] SECTIONING APPARATUS AND METHOD FOR CHARACTER RECOGNITION SYSTEMS
18 Claims, 11 Drawing Figs.

[52] U.S. Cl. .......... 340/146.3 R
[51] Int. Cl. .......... G06k 9/00
[50] Field of Search .......... 340/146.3

[56] References Cited
UNITED STATES PATENTS

| | | | |
|---|---|---|---|
| 3,104,371 | 9/1963 | Holt .......... | 340/146.3 |
| 3,500,324 | 3/1970 | Gorbatenko et al. .......... | 340/146.3 |
| 3,111,646 | 11/1963 | Harmon .......... | 340/146.3 |

*Primary Examiner*—Maynard R. Wilbur
*Assistant Examiner*—Leo H. Boudreau
*Attorney*—Sughrue, Rothwell, Mion, Zinn & Macpeak

ABSTRACT: In character recognition systems, there exists the problem of recognizing adjacent characters which are touching rather than being completely separated by blank spaces. The system described generates a section gate in dependence upon an algorithm geared to character topology. The section gate enables a segmentation system which is adapted to properly segment the characters.

INVENTORS
ALFRED CUTAIA
JOHN W. McCULLOUGH
DON W. PILLER

BY Sughrue, Rothwell, Mion, Zinn & Macpeak
ATTORNEYS

SECTIONING APPARATUS AND METHOD FOR CHARACTER RECOGNITION SYSTEMS

BACKGROUND OF THE INVENTION

1. Field of the Invention

The invention is in the field of character recognition systems. Specifically, it is related to a solution of the problem which occurs when adjacent printed characters are not properly separated but are touching or merged at their edges.

2. Description of the Prior Art

Most character recognition systems are structured to recognize a single character at a time. The recognition logics of such devices generally can successfully accept only isolated complete characters. Raster-type scanners present a continuous stream of information when scanning a line of characters. The recognition system must provide some means to detect the scan which begins a character and the scan which ends the previous character. This function is known as character segmentation.

Simple character recognition systems perform segmentation by requiring the input characters to be separated by blank scans. Provided this restriction is maintained, segmentation is trivial. However, few type fonts printed on standard printing devices have all the characters separated by blank scans.

Current hardware apparatus is capable of segmenting characters based upon predetermined pitch measurements. Such systems require predetermined pitch measurements to "-zone" the character into regions of increasing segmentation permissiveness as the scan count progresses from start of a character. The actual point at which touching characters are segmented is determined by some preselected average character width and local character features. This latter method is not dependent at all upon the total topology of the characters being read and furthermore is not applicable to reading proportional space printing since it requires essentially fixed width characters.

The actual segmenting of touching characters is in itself not the feature of the present invention. However, a brief understanding of what is meant by segmentation will assist in an understanding of the present invention. The function of segmentation is simply to separate touching characters. It is the actual breaking off of a scan video stream or, as conventionally implemented, a search for a break in the relationship between adjacent vertical scans. Many segmentation algorithms, developed by the assignee of the present invention and also by others, either use the analog video signals or digitized video from the character matrix and search for local signal correlations which are thought to be reliable indicators of character end. As a class, scan correlation schemes determine the correct segment point by looking for a relationship between the current, past, and possibly future vertical scans.

Much work has been done on these correlation schemes for segmenting touching characters but one of the drawbacks is that a correlation algorithm which is sufficient to separate characters having a high degree of touching, known as hard-touching characters, also has the tendency to make invalid segments within single characters. Consequently, a sectioning gate, generated by sectioning algorithm, apparatus, method, etc., would be useful to gate the hard-touching segmentation algorithm into operation only during the scans of probable character edges.

One prior form of sectioning is based merely upon an a priori pitch (character width) measurement. However, as indicated above, pitch measurements can only approximately locate the left side of any given character since individual characters from a given fixed pitch font have at least two to one width range.

Another class of sectioning techniques is based upon pattern feature extraction. Information from all scans of the character is used to generate a set of features adequate to define the sections scanned. One type of such technique searches for profile characteristics of the character black bit histogram while another of this type of technique looks for left side, downward curved, character features. Both are relatively simple feature generation schemes. At the opposite extreme, one might generate a complete feature list powerful enough for feature extraction recognition.

SUMMARY OF THE INVENTION

It is an object of the present invention to overcome the problems of sectioning, indicated above, by generating a section gate based upon medium power feature extraction techniques which are more applicable to sectioning than to recognition. The generation of the sectioning gate, which in turn enables the segmentation algorithm, depends only on the geometry of the character immediately under consideration. The algorithm involved in the present sectioning approach provides universal performance over a wide range of character styles and widths. The topological sectioning algorithm of the present invention is based on a set of three logical measurements on the digitized video as it is generated in real time and stored in a scan storage shift register. The three logical measurements are the leading edge stroke, (hereinafter designated by the symbol P), the lagging edge stroke (hereinafter designated by the symbol N) and the stroke density (hereinafter designated by L). From these measurements, which are made continuously across the character, a thresholdlike function is derived which is sensitive to terminating character topology. The function itself is based upon variably weighted sums of the stroke (scan) leading and trailing edge lengths and the scan bit density.

The basic topological feature upon which the sectioning algorithm is based is that the line integral around a complete character is zero. Stated another way, the sum of the vertical components of the leading edge strokes minus the sum of the vertical components of the lagging edge strokes is equal to zero. For less than a full character, or for a character which does not terminate in a blank scan but touches another character, the difference between these sums is equal to the vertical density of the current stroke. When characters come together, the zero condition is not reached at the end of the character. A decision as to where the sectioning gate should be generated is based upon a threshold value of the latter difference. The leading end lagging edge stroke values and the stroke density of the current stroke are variably weighted to arrive at a decision threshold which determines the scan in which sectioning should occur. The weighting factors are not constant but depend upon the character topology and density.

DETAILED DESCRIPTION OF THE DRAWINGS

Figures 1, 2:
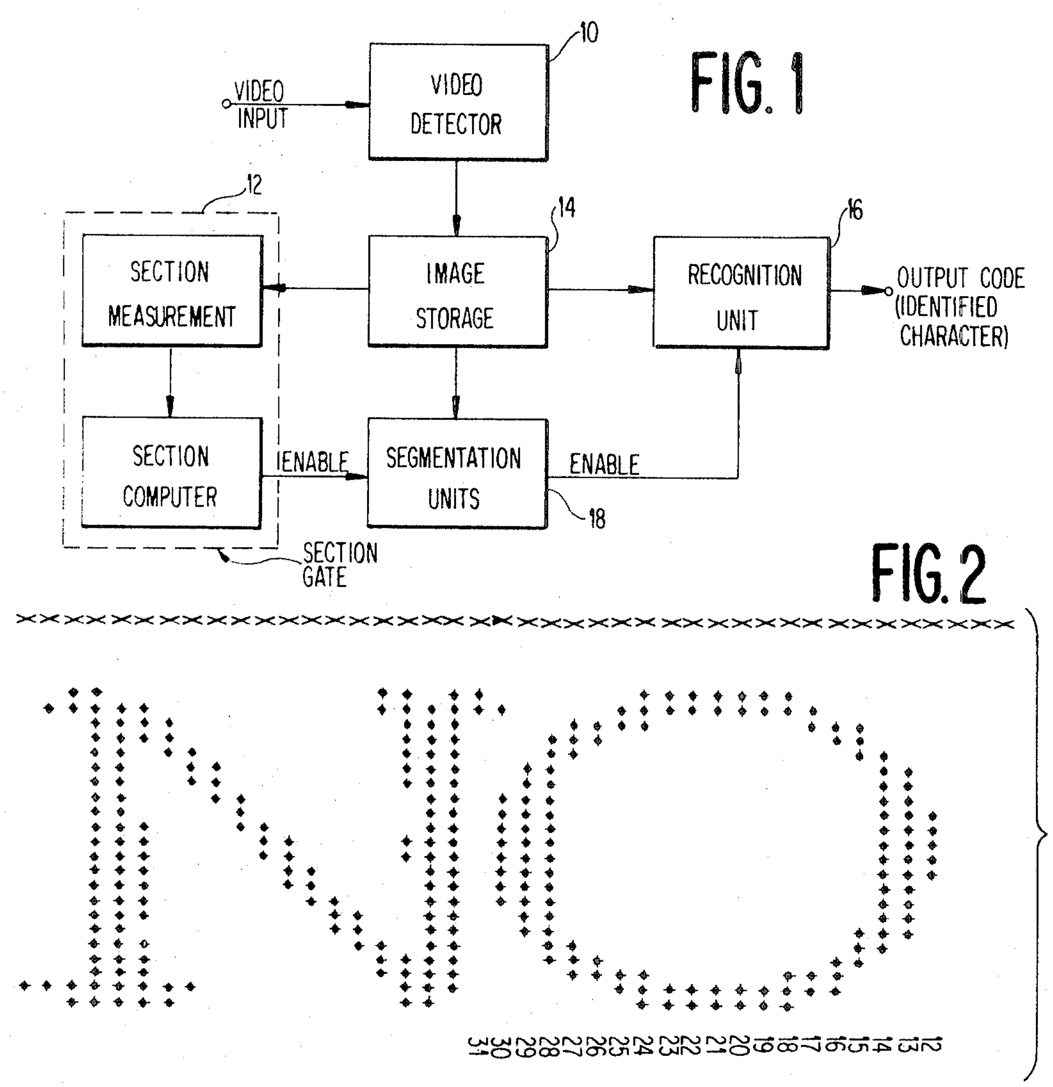
FIG. 1 is a system diagram of a character recognition system incorporating a means for generating a section gate in accordance with the teachings of the present invention.
FIG. 2 is an illustration of two touching characters.

FIG. 1 shows a basic system diagram of a character recognition system incorporating a means for generating a section gate in accordance with the teachings of the present invention.

The video input from the scanning system assumed herein to be a typical raster scanning system, which scans vertically from bottom to top and from right to left, is applied to a video detector 10 whose output is connected to an image storage means 14. The image storage 14 typically stores the video black bits in the matrix form representing the character being scanned. A segmentation unit which performs in accordance with known or future segmentation algorithms operates upon the stored image to segment touching characters in a manner mentioned above. The recognition unit 16 operates in accordance with recognition algorithms to detect the identity of characters stored in the matrix of the image storage means 14. The present invention is added to the just-described system for the purpose of enabling the segmentation unit 18 only during certain times. The section gate 12 operates upon the stored image in accordance with an algorithm to be described hereafter to determine an appropriate time when the segmentation unit should be enabled. In this manner, a segmentation unit which is capable of segmenting hard-touching characters will not be enabled during the middle of a single character and therefore will not separate a single character into two half characters.

Figure 3:
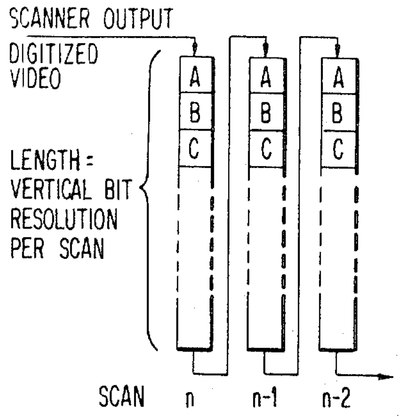
FIG. 3 is an illustration of serially arranged shift registers forming the character matrix means.

A simple example of two characters which are "touching" is shown in FIG. 2. Note, the numbers at the bottom of character "O" relate to the vertical scan numbers. The 30th scan, which is the last scan of character O, would, in a system of completely separated characters, be followed by a blank scan. However, since there is no blank scan separating the characters O and N, the characters are touching. The digitized video information representing the scan character is applied to and stored in a serial shift register of the type shown in FIG. 3. The length of each of the serially arranged shift registers is equal to the vertical scan or stroke length. The leftmost shift register represents the current scan, scan *n*, with the next shift register representing the video from scan $n-1$, etc. The top three register portions are identified vertically by the letters A, B, and C. The horizontal position is denoted by the scan numbers *n*, $n-1$, $n-2$. The bit information in the scan storage shift register of FIG. 3 is used to generate three pattern features which form the basis of the sectioning algorithm. Before discussing the sectioning algorithm in either general or specific form, the three pattern measurements will be described with reference to FIGS. 2, 3 and 4.

The terms and symbols used herein have the following meaning:

$P$ = the pattern measurement of the leading stroke edges. In the example shown in FIG. 4, $P=(A_n)(\bar{A}_{n-1})$. Stated in another manner, the leading stroke edge represents the vertical portion of the stroke which may also be a leading edge of the character. Note in stroke 12 of FIG. 2 the vertical density L, is equal to 5. Furthermore, since the entire vertical line of the character which is intercepted during stroke 12 is a leading edge, the value $P$ for stroke 12 is equal to 5 also.

The letter N is used to designate the pattern measurement of the lagging stroke edges. In the example shown in FIG. 4, $N=(\bar{A}_n) A_{n-1}$). An understanding of the meaning of the leading edge stroke (P), the lagging edge stroke (N), and the density (L), may be understood by considering the stroke or scan number 14 of the FIG. 2. It will be noted that the density $L_{14}=14$, since there are 14 black bits encountered during that scan. Two of the black bits are part of the leading edge of character—the topmost black bit and the lowermost black bit. Consequently, $P_{14}=2$. There are no lagging edge black bits involved in scan 14 and therefore $N_{14}=0$. However, in scan 15, $N_{15}=11$ since there are 11 bit locations not occupied by black bits which were occupied by black bits in the prior scan.

The sectioning algorithm of the present invention is based upon the following basic topological measurements. Assume the characters are scanned vertically from bottom to top and horizontally from right to left. The digitized video is shifted into the scan storage shift register of FIG. 3 and the measurements P, N, and L are made in accordance with the logic of FIG. 4. The basic topological relations satisfied by any binary pattern are given below in equations 1 and 2.

For each scan *n* across the pattern $$(1)\qquad \sum_{j=0}^{n} P_j - \sum_{j=0}^{n} N_j - L_n = 0$$

satisfied at natural segment defined by blank scans $$(2)\qquad \sum_{j=0}^{n} P_j - \sum_{j=0}^{n} N_j = 0$$

Equations (1) and (2) mean that at the end of each scan of the pattern, the vertical component of the leading stroke edges, less the vertical component of the trailing stroke edges, will equal the number of bits in scan *n*. Equation (2) is satisfied whenever scan *n* is blank, and as such, defines a natural segment point. This means that the trailing edge of all pattern line strokes previously found in that character have been passed. Table 1 below illustrates the pattern parameters resulting from scans 12 through 31 of the character O shown in FIG. 2.

TABLE 1

| Scan ($n$) | $\Sigma N_j$ | $\Sigma P_j$ | $L_n$ | $N_n$ | $P_n$ |
|---|---|---|---|---|---|
| 12 | 0 | 5 | 5 | 0 | 5 |
| 13 | 0 | 12 | 12 | 0 | 7 |
| 14 | 0 | 14 | 14 | 0 | 2 |
| 15 | 11 | 17 | 6 | 11 | 3 |
| 16 | 14 | 19 | 5 | 3 | 2 |
| 17 | 16 | 20 | 4 | 2 | 1 |
| 18 | 17 | 22 | 5 | 1 | 2 |
| 19 | 18 | 24 | 4 | 1 | 0 |
| 20 | 18 | 24 | 4 | 0 | 0 |
| 21 | 18 | 24 | 4 | 0 | 0 |
| 22 | 18 | 24 | 4 | 0 | 0 |
| 23 | 18 | 24 | 4 | 0 | 0 |
| 24 | 18 | 24 | 6 | 0 | 0 |
| 25 | 20 | 24 | 4 | 2 | 0 |
| 26 | 22 | 26 | 4 | 2 | 2 |
| 27 | 22 | 28 | 6 | 0 | 12 |
| 28 | 24 | 40 | 16 | 2 | 12 |
| 29 | 28 | 40 | 12 | 4 | 0 |
| 30 | 32 | 41 | 9 | 4 | 1 |
| 31 | 40 | 42 | 2 | 8 | 1 |

It will be noted that equation (1) is always satisfied but that at the end of scanning the character equation (2) is not satisfied due to the fact that the characters are "touching." Notice that if scan 31 were blank, equation (2) would be satisfied (defining a natural segment scan).

Figure 4:
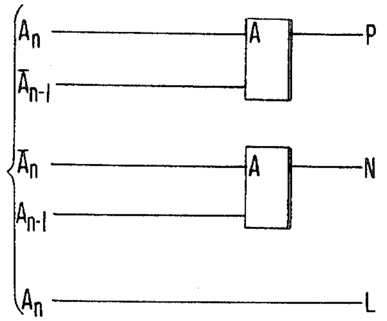
FIG. 4 is a block diagram of logic for deriving three pattern features necessary to the sectioning algorithm.

Since sectioning cannot be based upon satisfaction of equation (2) when characters are touching, the character sectioning algorithm is therefore based upon a threshold function $T$ which is derived from equations (1) and (2) and which is described in a general way by equation (3)

$$(3)\qquad T=f(\Sigma_c U[P])-f(\Sigma_c V[N])-f(\Sigma_s W[L])-X$$

where $C$ = sum over character $S$ = sum over scan $U, V, W, X$ = positive weighting coefficients and $P, N, L$ = *measurements of general form similar to those of FIG. 4 and also as shown below.*

It will be noted that the threshold, $T$, in equation (3) is dependent upon the summation of the leading edge stroke over the entire character, as weighted by a factor $U$, minus the summation of the lagging edge stroke over the entire character weighted by a factor $V$ minus the weighted density of the line currently scanned and minus an additional weighting coefficient $X$. In using equation (3) for sectioning in a particular application, it is formulated so that by choice of the measurements $P$, $N$, and $L$, and by variable control of the weighting coefficients across the character, the section area will be defined as beginning in the first scan that $T$ becomes equal to or less than O.

Figure 5:
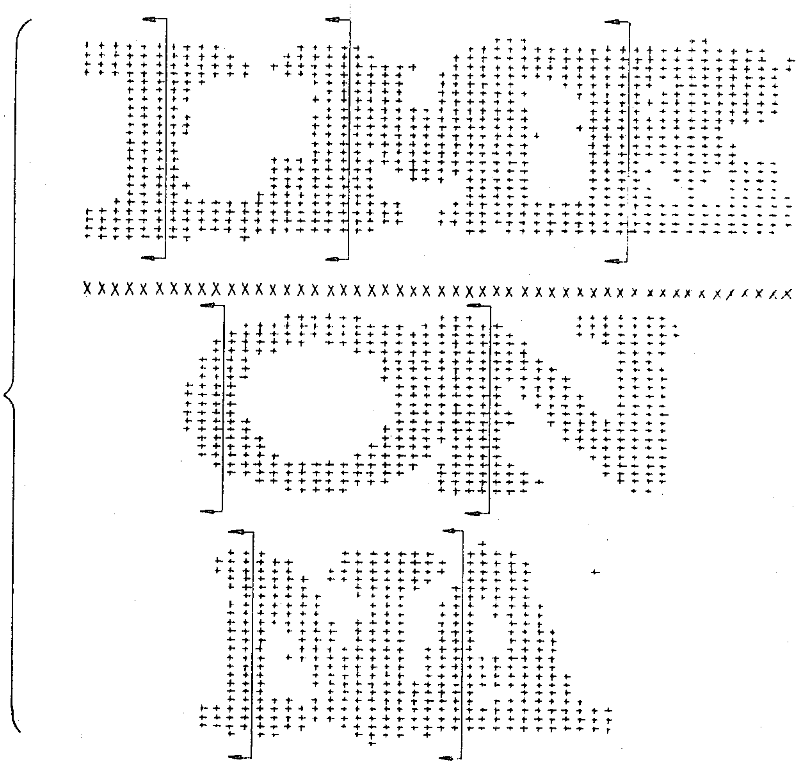
FIG. 5 illustrates three examples of touching characters.

Before giving specific examples of the sectioning algorithm and apparatus for carrying out the sectioning algorithm, a few general observations concerning character geometry and topology in regions where sections should occur will be given. A few examples showing touching characters, as well as the first allowable section scan are shown in FIG. 5. For characters that terminate in left verticals as does the E in the top line, the section threshold function can be satisfied off the left vertical if the coefficient ($V$) of the $N$measurement is increased in this area. This would be necessary because the $N$ measurement alone is quite small where the touching character terminates in a left vertical.

Considering the terminating character $N$ in the middle line, the terminating feature is largely obscured in the section area. A portion of the connection must be, in effect, subtracted off by the $W[L]$term and the $X$ term as the section area is encountered. the character A in the bottom line illustrates the occurrence of decreasing pattern bit density in the section area. It is noted that the solid vertical lines with the arrows at the ends thereof indicate the regions where the sectioning gate could initially be generated. Actual segmentation will occur several scans to the left of each vertical line.

General characteristics of the section area of characters can be summarized as follows:

1. $N$'s have a higher incidence due to trailing line edges suggesting that their coefficient should be increased near the section area;

2. $P$'s are unlikely in a section area since they indicate stroke leading edges. This fact suggests inclusion of an inhibitory term involving $P$ sums by scan;

3.The bit density $L$ is decreasing since line strokes are terminating;

4. The bit density in the first scan of section is likely to be large relative to the character height, for example in touching 0's.

Figure 6:
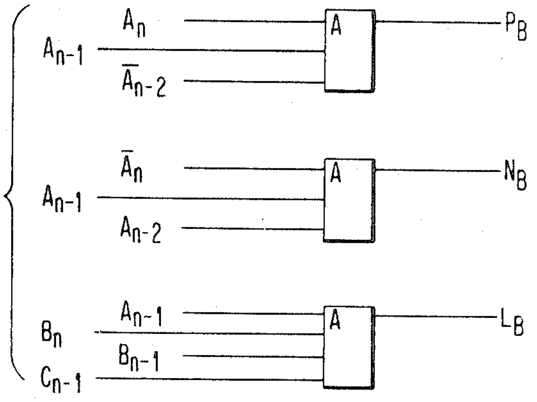
FIG. 6 is a block diagram of logic for deriving three pattern features of scanned characters.

Consider an example of a specific formulation of the sectioning algorithm. The basic $P$, $N$, and $L$ measurements are as defined by the logic shown in FIG. 6. This differs from the logic shown in FIG. 4 for generating the same parameters in that the horizontal ANDing of black bits in the $P$ and $L$ measurements has been added to reduce the effect of single bit-wide noise on the measurement results. Note also that in using the AND form of the $P$ and $N$ measurements, the difference of unity weighted $P$–$N$ after any scan in the character equals the number of AND bits between scans $n$ and $n$–1. The $L$ measurement has the triangular geometry shown for two reasons. First, its incidence is higher in areas of the pattern characterized by decreasing black bit densities, and second, its incidence is reduced in proportion to the number of horizontal line elements encountered in the vertical scan. Nonetheless, the quantities $P$, $N$, and $L$ still represent respectively the vertical component of the leading edge, the vertical component of the lagging edge, and the density of the scan. Based on the parameter measurements as indicated by the logic of FIG. 6, a specific example of the sectioning threshold function may take the form shown below in equation (4).

$$T_n=\sum_{j=0}^{n}(U_j[P_j]-V_j[N_j])-(X_n)+(Y_n[P_n]-W_n[L_n]) \quad (4)$$

where $n$ = scan number from start of character $U_j=1$ $V_j=1+0.05(F)+0.03(F)$ $Y_n=0.5$ $W_n=0.8+0.03(F)$ $X_n=F$ The values selected for the weighting functions are emperical values designed for 12-pitch characters nominal. It will be noted that the weighting functions $V$, $W$, and $X$ are variable weighting functions which are dependent upon the variables F and F. The variables F and F are feedback variables which themselves are dependent upon a connective feedback request identified as CFR. The values CFR, to be defined below, and therefore the values F and $\bar{F}$, are artificial weighting functions which relate to the topological parameters. Their purpose is to make sectioning more likely at the training character edge. The connective feedback request CFR is defined by equation (5).

$$(5)\quad CFR_n=CFR_{n-1}+1 \text{ when } \sum_{j=1}^{n}(U_j[P_j]-V_j[N_j]-3F)>1.5$$

$$CFR_n=CFR_{n-1} \text{ when } \sum_{j=1}^{n}(U_j[P_j]-V_j[N_j]-3F)\leq 1.5$$

Where $CFR=0$

From the formula for determining the value of CFR, it can be seen that the connective feedback request function increases as the total leading stroke edges is greater than the total lagging stroke edges (both weighted) by a certain amount. The artificial weighting functions F and F are defined by equations (6) and(7) below.

$$(6)\quad F_n=0 \text{ when } CFR_n<10$$

$$F_n=CFR_n-10 \text{ when } CFR_n\geq 10$$

$$\text{where } F_0=0$$

$$(7)\quad \bar{F}_n=\bar{F}_{n-1}+1 \text{ if } CFR_n\geq 1 \text{ and if } CFR_{n-1}=CFR_n$$

$$\bar{F}_n=\bar{F}_{n-1} \text{ if } CFR_n=CFR_{n-1}+1$$

$$\text{where } F_0=0$$

The connective feedback request is measured at the end of each scan as the scanner progresses across the character. For each scan, after which the relationship in equation (5) is satisfied, the CFR count is advanced by one. After the first 10 connective feedback requests, F is advanced 1 each time CFR is advanced. Function $\bar{F}$ is advanced 1 after each scan when CFR is not advanced, provided CFR has been satisfied at least once for that character.

The weighted sum across the character of $P$–$N$ (equation (5)) remains large if either the digitized video pattern is heavy or is composed of largely horizontal strokes like the character S. Large $P$–$N$ weighted summations indicates a high degree of connectivity and a larger probability of a more difficult section. In this case, the "heavy" feedback term F is advanced faster. On the other hand, a low connectivity causes the "light" feedback term F to be advanced faster. It can be seen by referring back to equation (4) that the feedback parameters F and F are contained in the negative quantities of the threshold equation. The "heavy" feedback parameter F lowers the threshold at a greater rate than the "lighter" feedback parameter F. At the start of scanning a character, the value $T_n$ is substantially equal to the sum of the leading edge strokes over the character minus the sum of the lagging edge strokes over the character plus a factor related to the difference between the leading edge strokes and the density in the last scan. If the connectivity is high (heavy density character), the difference between the character summation of the leading edge stroke and the character summation of the lagging edge stroke remains high but the value $T_n$ is lowered by the effect of feedback parameter F.

Figure 7:
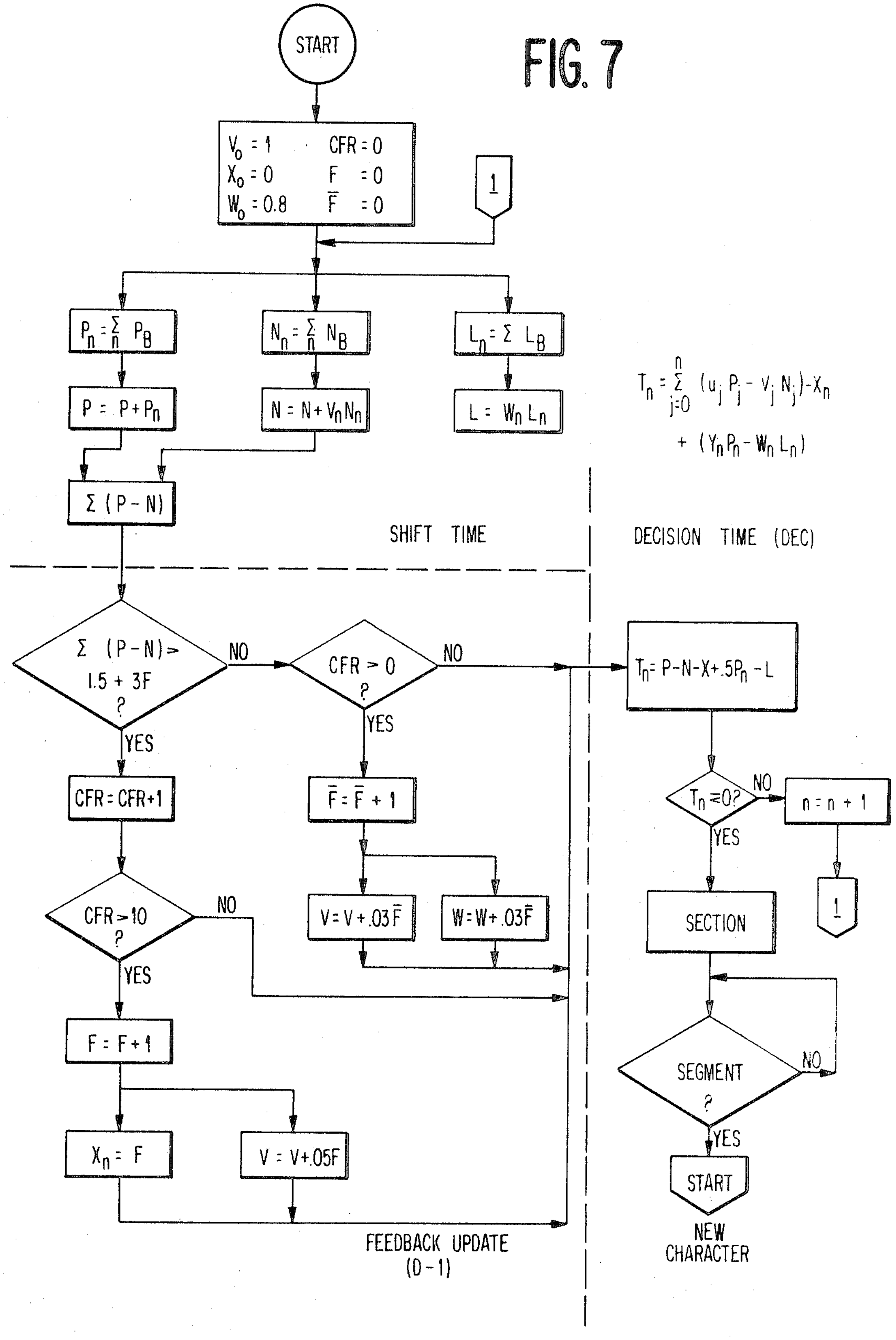
FIG. 7 is a flow diagram illustrating a computer execution of the sectioning algorithm.

The actual calculation of the value $T_n$ may be performed by a digital computer which is either a special purpose computer designed to perform the computation or a general purpose computer programmed to perform the computation, or by an analog computer. A program flow diagram suitable for operation on a general purpose digital computer for solving the equation (4) is illustrated in FIG. 7. FIG. 7 illustrates the sequence of computation for the section threshold function as the character is scanned in a real time application. The flow diagram is substantially self-explanatory as each block indicates the computational function performed with the original blocks indicating the initial values of the weighting functions. The basic computation cycle per scan may be divided into three sequential operations. Beginning at start time, the computation is initialized by setting the measurement coefficients to their initial condition values. First, the character is scanned during shift time. The digitized video scan output is entered into the scan storage shift register through the measurement matrix area. This allows the computation of the parameters $P$, $N$, and $L$, as well as the weighted sum over the character of $P$—$N$ for that scan. Secondly, during a last bit time of the scanning cycle, the connective feedback request functions are updated. For example, as can be seen in FIG. 7, if the $P$—$N$ sum over the character is greater than $1.5+3F1$.

As soon as the connective feedback request is greater than 10, the feedback parameter F becomes updated by 1 each time CFR increases by 1. Also, as necessary for the equation, the values X and V are updated in accordance with the new value of F. If the summation $P$—$N$ is not greater than $1.5+3F$, and also if CFR is greater than 0, then $\overline{F}$ is updated by 1.Following this, the values V and W are increased accordingly. Finally, during the first bit time of scanner retrace, called decision time hereinafter, the threshold function T, is computed to determine if this section requirement has been met. Note that the section requirement is met when the value T is less than or equal to O as described above. If the section requirement has not been met, the value $n$ which represents the scan number, is updated by 1 and the computation continues on the following scan. If the section threshold requirement is satisfied, the segmentation algorithms are enabled and the computation starts for the new pattern on the first scan following segment. The remainder of scan retrace time is used for resetting.

Figure 8:
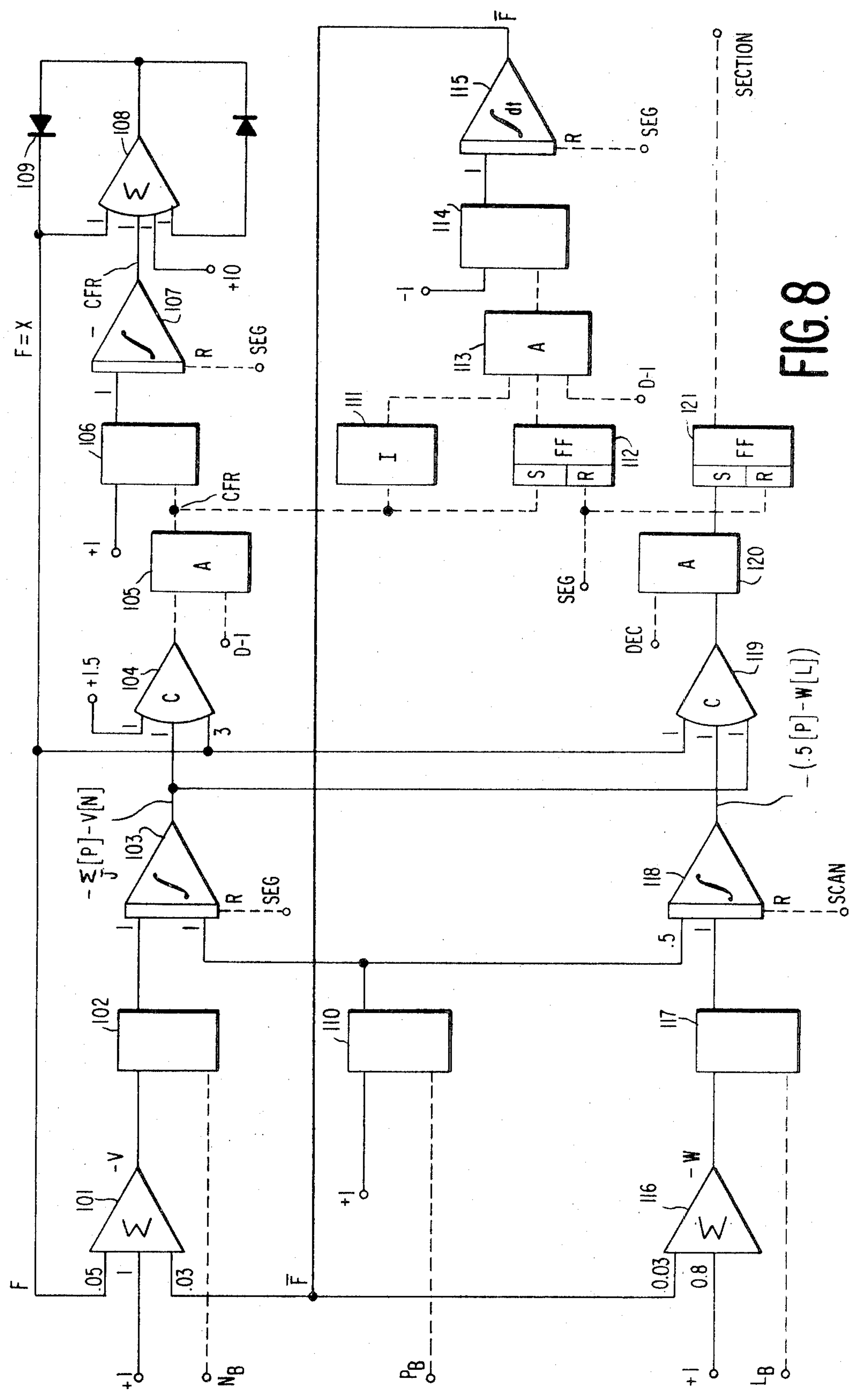
FIG. 8 is a block diagram of hardware specially designed for implementing the sectioning algorithm.

A block diagram of a hardware implementation of the sectioning algorithm for generating the section gate is illustrated in FIG. 8. The apparatus uses operational amplifiers, comparators, analog switches, and associated logic control functions. The numbers appearing at the inputs to the operational amplifiers 101, 103, 104, 107, 108, 116, 118, 119, and 115, represent the respective weights given to the voltages on the associated line. The operational amplifiers 103, 107, 115, and 118 are connected to function as integrators. Operational amplifiers 101 and 116 are connected to function as summation circuits, operational amplifier 108 functions as a zero limit summer as provided by diode 109 connected in the feedback loop and amplifiers 104 and 119 are connected as voltage comparators. The analog switches 102, 106, 110, 117, and 114, are needed only if the logic levels cannot be kept sufficiently constant to use as analog reference signals. The term "analog switch" or "analog gate" is equally applicable to this type of device.

The output of comparator 104 is considered true when the sum of the analog inputs is negative. The output of comparator 119 is considered true when the sum of the analog inputs is positive. The analog switches 102, 110, and 117 have analog outputs equal to the analog input when the logic control is true. In general, the interconnections shown by solid lines are analog signals and those shown by dashed lines are logic signals. At the end of a scan, prior to a new character, the system is initialized by resetting integrators 102, 107, 115, and 118 to zero output values by logical control of their reset input R. The relative gains of all inputs to analog components are shown in normalized units. Prior to scanning the first scan of a character, the initial conditions of the system are as follows. The output of summer amplifier 116, —W, is equal to 0.8 units since input $\overline{F}$ is 0. The output of integrator 103, which generates the sum over the character of the weighted $P$—$N$ measurements is 0. The output of integrator 118 which measures the weighted sum by scan of the P measurement is O. The output of integrator 107, which produces the sum of connective feedback requests CFR, over the character, is O. The output of integrator 115, which produces the sum over the character of F, is 0. The output of limit summer 108 is 0 since its only input is +10 units. Diode 109 limits the (inverted) output of limit summer 108 to positive values only. Therefore, since the sum of the inputs is positive, its output is 0.

The weighted sum of the measurements occurring in the current scan are summed through analog switches 102, 110, and 117 at the outputs of integrators 103 and 118. During the last bit time, $D$—1 of the current scan, AND-gate 105 is enabled. If the output of comparator 104 is true, AND-gate 105 is satisfied and a connective feedback request (CFR) is generated. This signal enables analog switch 106 and causes one feedback request to be summed at the output of integrator 107. Also, flip-flop 112 is set to indicate that the first connective feedback request has been received for that character. Following $D$—1 time, is decision time $D$, which enables AND-gate 120. Comparator 119 measures the complete section threshold function and supplies a second input to AND-gate 120. Following decision time, gate 120 is disabled and integrator 118 is reset. The reset condition continues until the end of scanner retrace time. At the end of scanner retrace time, shift time begins and computation of the threshold function for the following scan precedes.

if, at the end of shift time during the CFR update, or $D$—1 time, the output of AND-gate 105 is false (indicating no connective feedback request), the output of inverter 111 is true. If flip-flop 112 has been set on a prior scan, gate 113 is enabled which enables analog switch 114 during $D$—1 time, causing the output of integrator 115, $\overline{F}$, to be increased by 1. After the 10th CFR, the summed CFR at the output of integrator 107 is equal to —10 units. For each subsequent CFR, this output exceeds 10 units and the output from summer 108 is equal to F. As F and $\overline{F}$ are increased, these outputs are fed back to summing amplifiers 101 and 116, respectively, and increase weighting coefficients V and W. Finally, when the section scan of a character is reached, the section threshold function measured by comparator 119 will be satisfied. At decision time, gate 120 will be enabled which will set flip-flop 121, indicating a section condition. The section condition acts as an enabling function for segmentation. When the segment condition has been satisfied, during the scanner retrace time which follows decision time, the reset inputs of integrators 103, 107, 115, and 118 are enabled to reset the system to its initial condition state. At shift time, it will be conditioned to compute the section threshold function for the following character.

Figure 9:
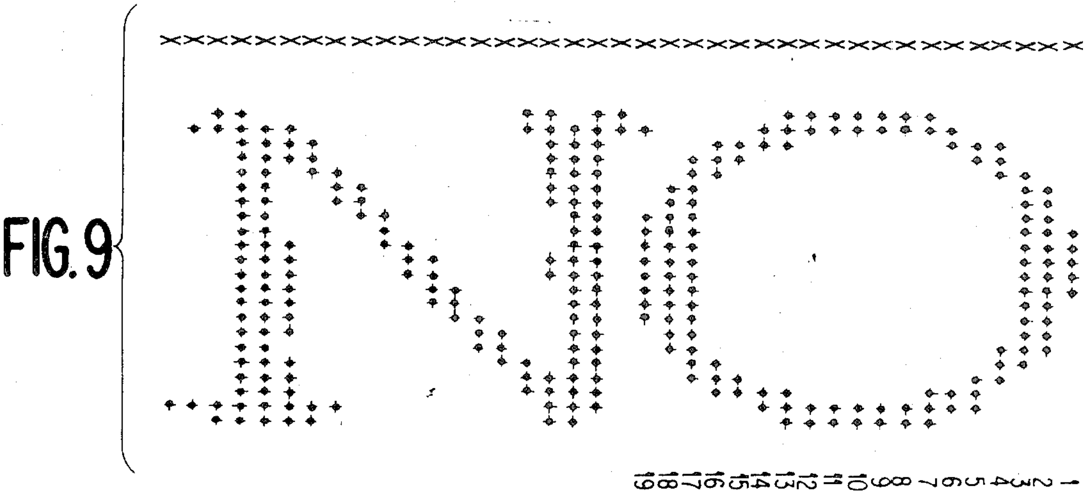
FIG. 9 illustrates lightly touching characters.
Figure 10:
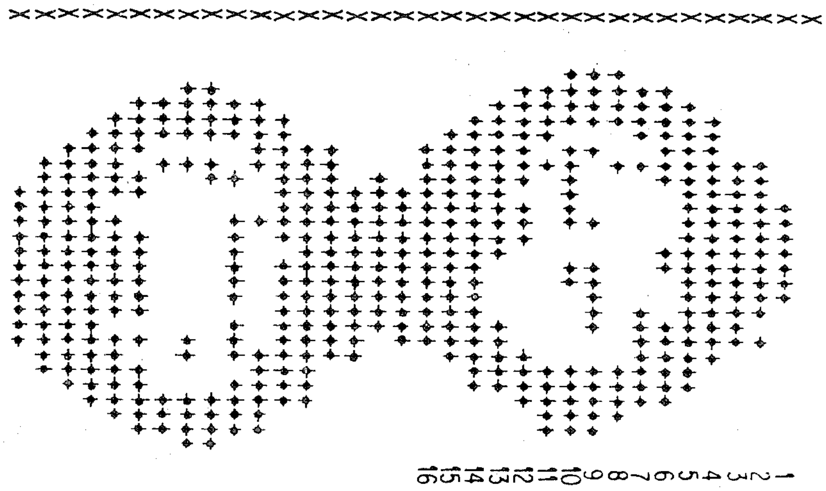
FIG. 10 illustrates hard-touching characters having heavy density.

FIG. 9 and table 2 below, which shows the values of the different parameters for the scans 1 through 19, illustrate a very light 10-pitch character zero. FIG. 10 and the values of the parameters listed in table 3 below illustrate a very heavy and

TABLE 2

| Scan(n) | $P_n$ | $\Sigma P_j$ | $N_n$ | $\Sigma V_j N_j$ | $L_n$ | P-N | $V_n$ | $X_n$ | $W_n$ | $CFR_n$ | $\overline{CFR}_n$ | $F_n$ | $\overline{F}_n$ | $T_n$ |
|---|---|---|---|---|---|---|---|---|---|---|---|---|---|---|
| 1 | 0 | 0 | 0 | 0 | 0 | 0 | 1 | 0 | .8 | 0 | 0 | 0 | 0 | 0 |
| 2 | 5 | 5 | 0 | 0 | 0 | 5 | 1 | 0 | .8 | 1 | 0 | 0 | 0 | 7.5 |
| 3 | 7 | 12 | 0 | 0 | 5 | 12 | 1 | 0 | .8 | 1 | 0 | 0 | 0 | 11.5 |
| 4 | 12 | 14 | 11 | 11 | 0 | 3 | 1 | 0 | .8 | 1 | 0 | 0 | 0 | 4.0 |
| 5 | 3 | 17 | 3 | 14 | 0 | 3 | 1 | 0 | .8 | 1 | 0 | 0 | 0 | 4.5 |
| 6 | 2 | 19 | 2 | 16 | 0 | 3 | 1 | 0 | .8 | 1 | 0 | 0 | 0 | 4.0 |
| 7 | 1 | 20 | 1 | 17 | 1 | 3 | 1 | 0 | .8 | 1 | 0 | 0 | 0 | 2.7 |
| 8 | 2 | 22 | 1 | 18 | 0 | 4 | 1 | 0 | .8 | 1 | 0 | 0 | 0 | 5.0 |
| 9 | 0 | 22 | 0 | 18 | 0 | 4 | 1 | 0 | .8 | 1 | 0 | 0 | 0 | 4.0 |
| 10 | 0 | 22 | 0 | 18 | 0 | 4 | 1 | 0 | .8 | 1 | 0 | 0 | 0 | 4.0 |
| 11 | 0 | 22 | 0 | 18 | 0 | 4 | 1 | 0 | .8 | 1 | 0 | 0 | 0 | 4.0 |
| 12 | 0 | 22 | 0 | 18 | 0 | 4 | 1 | 0 | .8 | 1 | 0 | 1 | 0 | 3.0 |
| 13 | 0 | 22 | 0 | 18 | 0 | 4 | 1.05 | 1 | .8 | 0 | 1 | 1 | 1 | 3.0 |
| 14 | 2 | 24 | 2 | 20.2 | 2 | 3.8 | 1.08 | 1 | .83 | 0 | 1 | 1 | 2 | 2.1 |
| 15 | 0 | 24 | 2 | 22.4 | 0 | 1.6 | 1.11 | 1 | .86 | 0 | 1 | 1 | 3 | 0.6 |
| 16 | 2 | 26 | 0 | 22.4 | 0 | 4.6 | 1.14 | 2 | .89 | 1 | 0 | 2 | 3 | 2.6 |
| 17 | 2 | 28 | 2 | 24.8 | 2 | 3.2 | 1.19 | 2 | .89 | 0 | 1 | 2 | 4 | 0.4 |
| 18 | 12 | 40 | 4 | 29.7 | 0 | 10.3 | 1.22 | 3 | .92 | 1 | 0 | 3 | 4 | 13.3 |
| 19 | 0 | 40 | 4 | 34.8 | 8 | 5.2 | 1.27 | 3 | .92 | 0 | 1 | 3 | 5 | *−5.2 |

*Section.

TABLE 3

| Scan(n) | $P_n$ | $\Sigma P_j$ | $N_n$ | $\Sigma V_j N_j$ | $L_n$ | P-N | $V_n$ | $X_n$ | $W_n$ | $CFR_n$ | $\overline{CFR_n}$ | $F_n$ | $\overline{F_n}$ | $T_n$ |
|---|---|---|---|---|---|---|---|---|---|---|---|---|---|---|
| 1 | 0 | 0 | 0 | 0 | 0 | 0.0 | 1 | 0 | .8 | 0 | 0 | 0 | 0 | ------- |
| 2 | 7 | 7 | 0 | 0 | 0 | 7.0 | 1 | 0 | .8 | 1 | 0 | 0 | 0 | 10.5 |
| 3 | 5 | 12 | 0 | 0 | 7 | 12.0 | 1 | 0 | .8 | 2 | 0 | 0 | 0 | 8.9 |
| 4 | 1 | 13 | 0 | 0 | 10 | 13.0 | 1 | 0 | .8 | 3 | 0 | 0 | 0 | 5.5 |
| 5 | 4 | 17 | 0 | 0 | 13 | 17.0 | 1 | 0 | .8 | 4 | 0 | 0 | 0 | 8.6 |
| 6 | 3 | 20 | 7 | 7 | 10 | 13.0 | 1 | 0 | .8 | 5 | 0 | 0 | 0 | 6.5 |
| 7 | 2 | 22 | 4 | 11 | 8 | 11.0 | 1 | 0 | .8 | 6 | 0 | 0 | 0 | 5.6 |
| 8 | 0 | 22 | 4 | 15 | 4 | 7.0 | 1 | 0 | .8 | 7 | 0 | 0 | 0 | 3.8 |
| 9 | 2 | 24 | 1 | 16 | 4 | 8.0 | 1 | 0 | .8 | 8 | 0 | 0 | 0 | 5.8 |
| 10 | 5 | 29 | 0 | 16 | 5 | 13.0 | 1 | 0 | .8 | 9 | 0 | 0 | 0 | 11.5 |
| 11 | 1 | 30 | 5 | 21 | 5 | 9.0 | 1 | 0 | .8 | 10 | 0 | 0 | 0 | 5.4 |
| 12 | 1 | 31 | 2 | 23 | 6 | 8.0 | 1 | 1 | .8 | 11 | 0 | 1 | 0 | 1.5 |
| 13 | 6 | 37 | 2 | 25.1 | 5 | 11.9 | 1.05 | 2 | .8 | 12 | 0 | 2 | 0 | 8.9 |
| 14 | 4 | 41 | 1 | 26.2 | 10 | 14.8 | 1.1 | 3 | .8 | 13 | 0 | 3 | 0 | 5.8 |
| 15 | 4 | 45 | 3 | 29.6 | 12 | 15.4 | 1.15 | 4 | .8 | 14 | 0 | 4 | 0 | 3.8 |
| 16 | 0 | 45 | 2 | 32 | 14 | 13.0 | 1.20 | 5 | .8 | 15 | 0 | 5 | 0 | *−4.0 |

*Section.

noisy 12-pitch character zero. The values in tables 2 and 3 represent the values in accordance with the equations given above and will be calculated by the apparatus illustrated in FIG. 8 or by a digital computer programmed in accordance with the algorithm shown in FIG. 7. These computations show the operation of the section threshold system as scanning progresses across the characters right to left. These two examples illustrate the ability of the connective feedback functions F and $\overline{F}$ to control the measurement weighting coefficient so as to satisfy the section threshold condition in the proper terminating line stroke area of the patterns. Since these feedback functions are controlled by the heaviness of the pattern, as well as the geometry, they are capable of properly controlling the weighting coefficients for all character shapes.

The above examples were based upon the specific equation (4) above and on the generation of the values P, N, and L in accordance with the logic illustrated in FIG. 6. However, it will be apparent That the weighting values in the equation may take on a different value and that the parameters P, N, and L may be based upon data obtained from more than three scans (as indicated in FIG. 6) without changing the basic nature of the invention.

Figure 11:
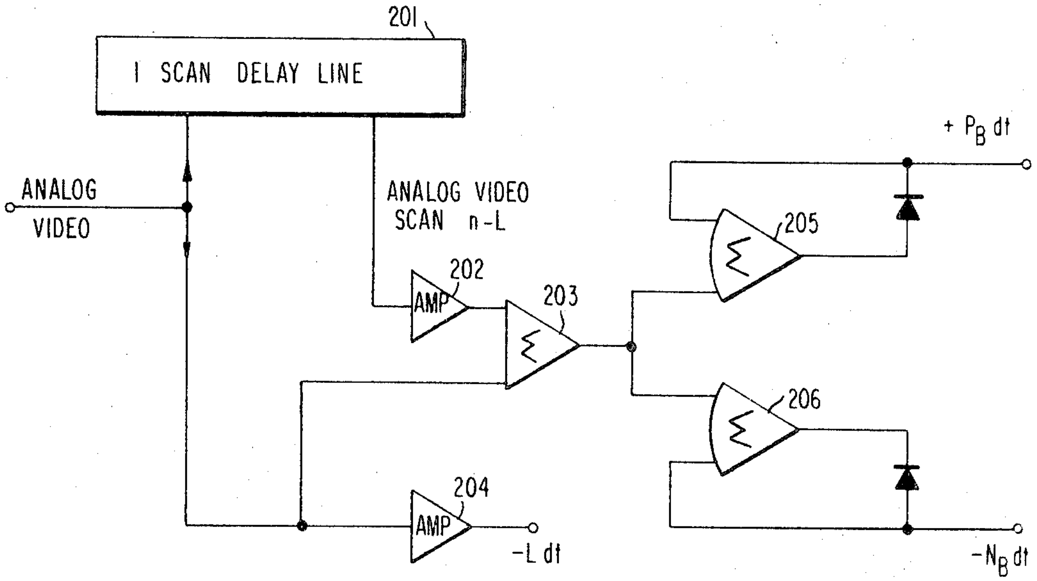
FIG. 11 is a block diagram of an analog circuit for deriving the sectioning parameters.

Furthermore, it is not necessary that the invention be utilized only with a digitized video source but its general application applies equally well to analog video information. An example of how the parameters P, N, and L can be derived from analog video is illustrated in FIG. 11. As seen there, the analog video is applied to a scan delay line 201 having a delay equal to a one scan period, and the output therefrom is applied to a summation circuit 103 via amplifier 202 along with the currently detected analog video. The output of summer 203 is the analog value representing the instantaneous difference between the video level of scans $n$ and $n-1$ as produced by the scan delay line 201. This output is fed to a pair of zero limit summers 205 and 206. The output of 205 can only be positive and represents a measure of the instantaneous P value. The output of 6 can only be negative and measures the instantaneous value −N. The output of amplifier 204 is the instantaneous value for the analog video L. These outputs may be used much the same as the digital to analog switch outputs of the implementation described above in connection with FIG. 8.

The description of a specific embodiment of the invention given above described one form which the general algorithm might take for a particular application. However, the algorithm can be modified depending on the source data to which it is applied. For example, if the data is particularly low quality with a high incidence of noise bits, the P N measurements can be the OR of two adjacent scans which, in effect, averages their incidence over a localized area. The form of the L measurement may be expanded over a larger vertical or horizontal area to account for extreme variations in line width or particular character geometries. A different form of measurement coefficient control could be introduced by using the convolution property of the geometry of many characters. For example, characters like M and O are characterized by multiple line elements in the horizontal plane. The coefficients of the resulting N and P measurements for subsequent line edges following the first line edge can be increased or decreased respectively to support the section threshold function independent of character width for proportional spaced data. Furthermore, for this application the connective feedback function might be updated at specific geometry changes rather than by scan to further reduce the character width dependence. Also, for application to predetermined pitch fonts, constraints can be introduced more heavily by scan count than in the example given.

What is claimed is:

1. In a character recognition system the method of generating a gating signal defining an area for separating adjacent characters, said method comprising:

a. scanning characters to be recognized and developing an electronic equivalent of the forms of said characters,
b. detecting a first parameter indicative of leading stroke edges of said character,
c. detecting a second parameter indicative of lagging stroke edges of said character,
d. generating weighting functions for said first and second parameters,
e. weighting said first and second parameters by said respective weighting functions,
f. generating a difference value dependent upon the difference between the weighted first and second parameters, and
g. activating a sectioning gate to generate said gating signal when the said difference value is below a predetermined threshold value.

2. The method as claimed in claim 1 wherein said method further comprises:

a. generating a heavy feedback parameter when the weighted difference between said first and second parameters is above a minimum value for a predetermined number of scans across a character,
b. increasing said generated heavy feedback parameter as the weighted difference between said first and second parameters minus a function of said heavy feedback parameter remains above said minimum value for continued scans across said character, and
c. wherein the step of generating a difference value more specifically comprises generating said difference value dependent upon said weighted difference minus said heavy feedback parameter.

3. The method as claimed in claim 1 further comprising:

a. generating a character density parameter representing the amount of character encountered by the present scan across said character,
b. generating a weighting function for said character density parameter,
c. weighting said latter weighting function by said character density parameter to form a weighted character density parameter, and
d. wherein the step of generating a difference value more specifically comprises generating said difference value dependent upon said weighted difference minus said weighted character density parameter.

4. The method as claimed in claim 2 further comprising:

a. generating a character density parameter representing the amount of character encountered by the present scan across said character, b. generating a weighting function for said character density parameter, c. modifying said latter weighting function by said character density parameter to form a weighted character density parameter, and d. wherein the step of generating a difference value more specifically comprises generating said difference value dependent upon said weighted difference minus said weighted character density minus said heavy feedback parameter.

5. The method as claimed in claim 4 further comprising generating a light feedback parameter having a value dependent upon the number of scans across said character for which said weighted difference minus said function of said heavy feedback parameter is not greater than said minimum value, and wherein the step of generating weighting functions for said first and second parameters comprises generating a weighting function for said second parameter dependent upon said light and heavy feedback parameters.

6. A method for use with a character recognition system of the type which scans across a character containing document, each scan being referred to as a stroke, develops black bits corresponding to the stroke intercepting a character, develops from said black bits an electronic black bit representation of the character scanned by a plurality of strokes, and recognizes a character from the black bit representation, said method comprising:

a. generating for each stroke ($n$), in response to detected black bits, a first parameter ($P_n$) which is a measure of the amount of the stroke which intercepts leading edges of a character, b. generating for each stroke ($n$), in response to detected black bits, a second parameter ($N_n$) which is a measure of the amount of the stroke which intercepts lagging edges of a character, c. generating for each stroke ($n$), in response to detected black bits, a third parameter ($L_n$) which is a measure of the amount of the stroke which intercepts a character, d. Multiplying said first parameter by a first weighting function ($U_n$) to form a weighted first parameter ($U_nP_n$) for each stroke, e. multiplying said second parameter by a second weighting function ($V_n$) to form a weighted second parameter ($V_nN_n$) for each stroke, f. forming a summation of the difference between said weighted first and second parameters, $$\left[\sum_{j=1}^{n}(U_jP_j-V_jN_j)\right]$$

g. multiplying said third parameter by a third weighting function ($W_n$) to form a weighted third parameter ($W_nL_n$), and h. forming a difference quantity dependent upon the difference between said summation and said weighted third parameter, and i. activating a sectioning gate when said difference quantity is below a predetermined character separation threshold value.

7. The method as claimed in claim 6 further comprising:

a. generating a connective feedback request function (CFR) having unity value when said summation is greater than a preset value, and b. increasing said generated connective feedback request function by unity value after each stroke when said summation is greater than said preset value plus a factor times a heavy feedback function (F), said heavy feedback function being equal to zero and CFR−10, whichever is larger, c. wherein said difference quantity is dependent upon said summation minus said weighted third parameter minus said heavy feedback function.

8. The method as claimed in claim 7 further comprising:

a. multiplying said first parameter ($P_n$) by a fixed amount (K) to form a multiplied first parameter, and b. wherein said difference quantity is equal to said summation minus said weighted third parameter minus said heavy feedback function plus said multiplied parameter $$\left[\sum_{j=1}^{n}(U_jP_j-V_jN_j)-F_n+KP_n-W_nL_n\right]$$

9. The method as claimed in claim 8 further comprising: generating a light feedback function ($F_n$) equal to one less than the number of strokes for which said summation is not greater than said preset value plus a factor times the heavy feedback function ($F_n$).

10. The method as claimed in claim 9 wherein said second weighting function ($V_n$) is equal to a predetermined value plus a first percentage of said heavy feedback function ($F_n$) and a second percentage of said light feedback function ($\bar{F}_n$), said first percentage being much greater than said second percentage.

11. In a character recognition system of the type which scans a document containing characters, generates electronic black bits corresponding to scan intercept of a character, recognizes the character scanned from the black bits developed over a plurality of successive scans across the character, a system for generating a separation gating signal to enable a segmentation means to segment touching characters, said system comprising:

a. means responsive to said black bits for generating a first quantity $P_n$ for each scan $n$, said quantity representing the amount of the scan which intercepts leading edges of a character, b. means responsive to said black bits for generating a second quantity $N_n$ for each scan $n$, said quantity representing the amount of the scan which intercepts lagging edges of a character, c. means responsive to said black bits for generating a third quantity $L_n$ for each scan $n$, said quantity representing the black bit density of the character intercepted by the scan, d. a weighting function generator for generating a weighting function $V_n$, e. means responsive to said weighting function $V_n$, said first quantity $P_n$ and said second quantity $N_n$ for generating a summation quantity related to $$\sum_{j=1}^{n}(P_j-V_jN_j)$$

where $n$ is the number of the scan across the character starting from the first scan across the character, f. a weighting function generator means for generating a weighting function $W_n$, and g. means responsive to said weighting function $W_n$, said summation quantity, and said third quantity $L_n$ for initiating a sectioning gating signal when a difference value dependent upon the difference between said summation quantity and the value of $W_nL_n$ is equal to or less than a preset threshold level.

12. The system as claimed in claim 11 further comprising:

a. a connective feedback request generator having three inputs, one corresponding to said summation quantity and a second being a fixed amount, for generating a connective feedback request function (CFR) having a value dependent on the number of scans across a character for which said summation quantity minus the quantity at said third input is greater than said fixed amount, b. a heavy feedback generation responsive to said connective feedback request function for generating a heavy feedback function (F) after said connective feedback request reaches a predetermined value, said heavy feedback function (F) being equal to the value of said connective feedback request (CFR) minus said predetermined value, c. means for applying said heavy feedback function (F) times a preselected factor as the third input to said connective feedback request generator, d. means for applying said heavy feedback function as an input to said initiating means whereby said difference value is dependent upon the said summation quantity minus the value of $W_nL_n$ minus said heavy feedback function ($F_n$).

13. The system as claimed in claim 12 further comprising: means for connecting said first quantity $P_n$ to said initiating means whereby said difference value is equal to said summation quantity minus said value $W_nL_n$ minus said heavy feedback function $F_n$ plus a preselected percentage of said first quantity $P_n$, and where said preset threshold level is zero.

14. The system as claimed in claim 13 further comprising:

a. light feedback generator means connected to said connective feedback request generator for generating a light feedback function ($\overline{F}_n$) in response to said connective feedback request function ($CFR_n$) being equal to or greater than unity value, and having a value dependent upon the number of scans of said character for which said summation quantity minus said heavy feedback function ($F_n$) times said preselected factor is not greater than said fixed amount, b. means for connecting said heavy feedback function ($F_n$) and said light feedback function ($\overline{F}_n$) to said weighting function generator for generating the weighing function ($V_n$) and c. means for connecting said heavy feedback function (F) to said second weighting function generator.

15. The system as claimed in claim 14 wherein a. said means for generating said first quantity $P_n$ comprises circuit means responsive to said black bits for generating a gating output $P_b$ in response to a detected black bit pattern representing part of a leading edge stroke, b. said means for generating said second quantity $N_n$ comprises circuit means responsive to said black bits for generating a gating output $N_b$ in response to a detected black bit pattern representing part of a lagging edge stroke, and c. said means for generating said third quantity $L_n$ comprises circuit means responsive to said black bits for generating a gating output $L_b$ in response to a detected black bit pattern representing part of a character.

16. The system as claimed in claim 15 wherein said means for generating said summation quantity comprises:

a. an operational amplifier integrator, having two inputs and an output, for integrating the difference between the two electrical quantities applied to the said two inputs, b. a first analog switch means having a gating input connected to said first quantity generating means and an analog input connected to an electrical quantity representing unity, for transferring said unity quantity to the output of said first analog switch in response to each gating pulse $P_b$, said output being connected to the first input of said operational amplifier integrator, and c. a second analog switch means having a gating input connected to said second quantity generating means and an analog input connected to the output of said $V_n$ weighting function generator, for transferring said $V_n$ weighting function to the output of said second analog switch in response to each gating pulse $N_b$, said output being connected to the second input of said operational integrator.

17. The system as claimed in claim 16 wherein said means for initiating a sectioning gate comprises:

a. a third analog switch means, having a gating input connected to said third quantity generating means and an analog input connected to said $W_n$ weighting function generator, for transferring said $W_n$ weighting function to the output of said third analog switch means in response to each gating pulse $L_b$, b. a second operational amplifier integrator means, having one input connected to the output of said second analog switch and a second input connected to the output of said third analog switch for integrating over a single scan the difference between a percentage of the quantity applied to said first input and the quantity applied to said second input, and c. a comparator means, having said summation quantity connected to one input, said heavy feedback function connected to a second input, and the output from said second operational amplifier integrator connected to a third input, for providing an output gating function when the quantity on said first input minus the quantity on said second input plus the quantity on said third input is equal to or less than 0.

18. The system as claimed in claim 17 wherein said connective feedback request generator comprises:

a. a second operational amplifier comparator means, having said summation quantity applied to one input thereof, said heavy feedback function applied to a second input thereof and an electrical quantity corresponding to said fixed amount applied to a third input thereof, for providing a gating output whenever said summation quantity minus said preselected factor times the heavy feedback function is greater than said fixed amount, b. fourth analog switch means, having a gating input and an analog input, for transferring the quantity applied to said analog input to the output thereof in response to each gating pulse applied to said gating input, said applied quantity being equal to unity value, c. gating means connected to said second operational amplifier comparator output and said fourth analog switch for applying the output from said second comparator to the gating input of said fourth analog switch at the end of each scan, and d. a third operational amplifier integrator means, connected to the output of said fourth analog switch, for integrating the output of said fourth analog switch over a plurality of scans.

* * * * *